United States Patent [19]

Hofland et al.

[11] Patent Number: 5,064,892
[45] Date of Patent: Nov. 12, 1991

[54] RESIN COMPOSITION BASED ON A POLYMER AND AN ESTER

[75] Inventors: Adriaan Hofland; Joannes M. Paauwe, both of Zwolle, Netherlands

[73] Assignee: Stamicarbon B. V., Geleen, Netherlands

[21] Appl. No.: 395,719

[22] Filed: Aug. 18, 1989

Related U.S. Application Data

[63] Continuation-in-part of Ser. No. 233,436, Aug. 18, 1988, abandoned.

[30] Foreign Application Priority Data

Aug. 28, 1987 [NL] Netherlands ............... 8702018
Sep. 20, 1988 [NL] Netherlands ............... 8802321

[51] Int. Cl.$^5$ ................ C08J 00/00; C08K 5/10; C08L 00/00
[52] U.S. Cl. ................. 524/317; 260/410.6; 260/410.7 N; 528/303
[58] Field of Search .......... 260/410.6, 410.9 N; 528/303; 524/317

[56] References Cited

U.S. PATENT DOCUMENTS

| | | | |
|---|---|---|---|
| 3,287,292 | 11/1966 | Dalibor | 525/7 |
| 3,287,293 | 11/1966 | Dalibor | 525/7 |
| 3,423,319 | 1/1969 | Parker et al. | 252/49.8 |
| 3,586,530 | 6/1971 | Aronoff et al. | 428/413 |
| 3,676,398 | 7/1972 | D'Alelio | 526/301 |
| 3,952,032 | 4/1976 | Vrancken et al. | 260/4.8 |
| 4,104,215 | 8/1978 | Aimono et al. | 525/7 |
| 4,111,871 | 9/1978 | Aritomi | 525/7.1 |
| 4,513,349 | 4/1985 | Olson et al. | 528/303 |
| 4,533,723 | 8/1985 | Weitemeyer | 361/311 |

FOREIGN PATENT DOCUMENTS

| | | |
|---|---|---|
| 431057 | 8/1967 | European Pat. Off. . |
| 2190672 | 11/1987 | European Pat. Off. . |
| 0253474 | 1/1988 | European Pat. Off. . |
| 1161014 | 1/1964 | Fed. Rep. of Germany . |

OTHER PUBLICATIONS

Chem. Abstracts 86 (No. 6) Abstract No. 30681 r (Feb. 7, 1977).

Primary Examiner—Paul R. Michl
Assistant Examiner—U. K. Rajguru
Attorney, Agent, or Firm—Cushman, Darby & Cushman

[57] ABSTRACT

The invention relates to a resin composition based on a polymer and an ester of an unsaturated fatty acid and an alchol containing a terminal unsaturation. The resin composition contains as ester a compound with the formula:

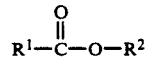

where:
 $R^1$ is an alkylene radical with 10–24 carbon atoms and at least one non-terminal ethylenically unsaturated bond and
 $R^2$ is a derivative of an organic group comprising one or more terminal allylether groups.

The resin composition is preferably substantially 100%-solid.

20 Claims, No Drawings

RESIN COMPOSITION BASED ON A POLYMER AND AN ESTER

RELATED APPLICATIONS

This application is a continuation-in-part of U.S. application Ser. No. 07/233,436, now abandoned.

FIELD OF THE INVENTION

The invention relates to a resin composition based on a polymer and an ester of an unsaturated fatty acid and an alcohol that contains a terminal unsaturation.

BACKGROUND OF THE INVENTION

A resin composition based on a polymer and such an ester is known from U.S. Pat. No. 4,311,624. This publication describes a resin composition, which contains film-forming components such as drying oils, alkyd resins and vinyl addition polymers, and a mixture of (a) a dicyclopenenytloxyalkyl ester of an ethylenically unsaturated mono- or dicarboxylic acid and (b) a (meth-)acryloxyalkyl ester of an unsaturated fatty acid. The compounds mentioned as (a) and (b) are also known as reactive diluents.

Such resin compositions are particularly used as binding agents in coating compositions. Nowadays, efforts are made to use coating compositions with a lower percentage of, or even without (the so-called '100%-solids system'), volatile solvents on account of the environmental problems connected with the use of these organic solvents and the associated environmental laws. One of the possibilities of solving these problems is to use reactive diluents in the resin compositions for coating compositions. These diluents are usually compounds with a low viscosity and a high boiling point, or low saturated vapour pressure, which act as solvent during the process but can subsequently also ba polymerized along with the rest of the compound. In this manner the environmental pollution caused by the conventional solvents can be reduced. The requirements to be met by these compounds are such that on the one hand they can be used as cross-linking agents and that, on the other, they contribute towards the good properties that a coating composition is required to have.

A disadvantage of the resin compositions based on a polymer and the known reactive diluents and the resulting coating compositions is that the monomers used as reactive diluents are too volatile and/or the properties of the resulting coating compositions, such as the drying properties, do not meet the requirements and/or the monomers to be used as reactive diluents are difficult to prepare and very expensive and/or the monomers are insufficiently soluble and do not mix sufficiently with the polymers and/or the reactive diluents do not have an optimum diluting effect.

SUMMARY AND DESCRIPTION OF THE INVENTION

The aim of the invention is to provide a resin composition based on a polymer and an ester as a reactive diluent that does not present the aforementioned disadvantages.

The resin composition according to the invention is characterized in that, the resin composition contains as ester a compound with the formula:

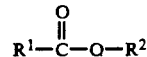

where:
- $R^1$ is an alkylene radical with 10-24 carbon atoms and at least one non-terminal ethylenically unsaturated bond and
- $R^2$ is a derivative of an organic group comprising one or more terminal allylether groups.

The coating compositions that are obtained by using the resin composition according to the invention present unexpectedly good drying properties.

The weight ratio of the ester and the polymer may, in absence of volatile organic solvents (the so-called '100%-solid systems') vary within wide limits. If a very low viscosity is desired, up to 80% by weight ester may be used.

According to a preferred embodiment of the invention the resin composition is substantially 100% solid.

If the ester is combined with conventional solvents, for example white spirit, or with a polymer or oligomer with a low melting point, 1% by weight ester as reactive diluent may already be advantageous.

According to a preferred embodiment of the invention, the resin composition contains 20-99 wt % polymer and 1-80 wt % ester (the weight percentages being based on the total amount of polymer and ester).

Preferably the resin composition contains 50-95 wt % polymer and 5-50 wt % ester, in particular 70-90 wt % polymer and 10-30 wt % ester.

According to another preferred embodiment of the invention the resin composition contains as ester a compound with the formula:

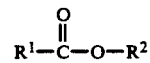

where:
- $R^1$ is an alkylene radical with 10-17 carbon atoms and at least one non-terminal ethylenically unsaturated bond and $R^2$ is a derivative of an organic group comprising one or more terminal allylether groups.

In such a composition containing alkyd resins, the diallylether of trimethylolpropane in particular, esterified with a polyunsaturated fatty acid such as tall oil fatty acid, produces a paint that dries well and has a high solids content.

However, the aforementioned paint composition can show the problem that the finishing layer obtained has a not completely sufficient scratch resistance and that, although good initial drying behaviour is obtained, the hardening or further drying behaviour asks for further improvement.

Moreover, the paint composition sometimes tends to sag after application at the processing viscosity.

The present invention further provides an improved reactive diluent, which gives even better paint compositions.

This improvement relates to a reactive diluent for paint compositions comprising a fatty acid ester of a polyalcohol allyl ether where in the diluent also comprises an oligomer with at least ten unsaturated fatty acid units.

Preferably, the oligomer has between 12 and 20 fatty acid units, more in particular between 13 and 17 fatty acid units.

The molecular weight of the oligomer is preferably between 2000 and 8000, more in particular between 4000 and 6000.

Surprisingly, a mixture of a above described reactive diluent and the aforementioned oligomer has such a low viscosity, in spite of the relatively fairly high molecular weight of the oligomer, that the mixture can be used very well as a reactive diluent.

In addition, it has been found that the composition per se has good air-drying properties and can be used as binding agent without other resins. A binding agent based on the aforementioned mixture is particularly suitable in primers, in which, on account of its low viscosity, the binding agent can be combined with a large amount of fillers.

The oligomer can be prepared by esterifying a multivalent acid, a polyalcohol and fatty acids.

Examples of the multivalent acids that can be chosen are benzenetetracarboxylic acid, trimellitic acid, naphthalenetetracarboxylic acid or a different acid with a functionality of preferably three or more. Optionally, an acid with a lower functionality may be used.

As polyalcohol an alcohol is preferably chosen with between 4 and 10, preferably between 6 and 10, free alcohol groups, for example pentaerythritol, dipentaerthyritol and glucose.

The polyalcohol is used in approximately equimolar amounts with respect to the number of acid groups of the multivalent acid.

The fatty acid is used in the desired amount with respect to multivalent acid plus the polyalcohol. In practice, this is about the number of moles, with respect to one mole of multivalent acid, that is desired to obtain the oligomer with more than ten unsaturated fatty acid chains.

Very suitable is, for instance, the esterification product of 1 mole of trimellitic acid anhydride, 3 moles of dipentaerythritol and 15 moles of soyabean fatty acid.

The ratio of fatty acid ester of polyalcohol allyl ether and oligomer is preferably between 10:90 and 90:10, in particular between 25:75 and 75:25, more in particular between 50:50 and 70:30.

From a process point of view it is very advantageous to prepare the ester and the oligomer simultaneously in one vessel.

A resin composition according to the improvement comprises a polymer preferably an alkyd resin, and a reactive diluent consisting of a mixture of oligomer and ester.

The weight ratio of the ester plus oligomer and the polymer may vary within wide limits. If a very low viscosity is desired, up to 80% ester plus oligomer may be used, but when combined with conventional solvents, or with a polymer or oligomer with a low melting point, 1% ester plus oligomer may already be advantageous. According to a preferred embodiment of the invention, the resin composition contains 20-99 wt. % polymer and 1-80 wt. % ester plus oligomer (the weights being based on the amounts of polymer+reactive diluent).

The resin composition preferably contains 40-90 wt. % polymer, and 10-60 wt. % ester plus oligomer, in particular 50-80 wt. % polymer and 20-50 wt. % ester plus oligomer.

The resin composition may be used as such as a binding agent for, for example, paint. It is also possible to use non-reactive solvents. As such, for example, conventional solvents may ba used, such as aromatic or aliphatic hydrocarbons with 6-25 carbon atoms. The amount of solvent is preferably less than 40 wt. %, more particularly less than 15 wt. % (with respect to the polymer plus reactive diluent). In practice, the amount of solvent will often be chosen on the basis of economic consideration (cost price). In the currently produced 'high solids' paints up to 15-20% solvent may be used.

Thus, according to a preferred embodiment of the invention the ester is applied in combination with an oligomer based on for example trimellitic acid anhydride, pentaerytritol and soya bean fatty acid. The resin composition contains preferably 20-99% by weight polymer, 5-50% by weight ester and 0.1-50% by weight oligomer. The weight ratio in for example the oligomer between trimellitic acid anhydride, pantaerytritol and soya bean fatty acid is for example 1:3:15.

As polymer, the resin composition according to the invention may contain any polymer that is cured by radical polymerization. In particular, all polymers that are air dryable are suitable, for instance an alkyd resin, a (modified) condensation polymer or a vinyl addition polymer. Instead of the polymer, drying oil (or oils) may be used.

According to a preferred embodiment of the invention, an alkyd resin is used as polymer. Alkyd resins are prepared by esterifying polyalcohols and polybasic acids or their anhydrides, usually also with fatty acids. Most alkyd, resins are very viscous; for practical use they are therefore sold in solution. The properties are in the first place determined by the nature and proportion of the alcohols and acids used and by the degree of condensation. Certain modifications in the composition, such as styrene and silicone alkyds, result in products with special properties. Alkyd resins obtained by esterifying a dibasic acid, mostly phthalic acid, and a trivalent alcohol, usually glycerol, are thermosetting brittle resins that are soluble in alcohol at a low degree of condensation. Those obtained by esterifying a bivalent alcohol, for example glycol, and a dibasic acid, such as phthalic acid, whether or not with addition of a non-setting fatty acid, are thermoplastic resins which dissolve in hydrocarbons and are used mainly as plasticizers. The alkyd resins can be classified in fatty alkyds, with a fatty acid content of more than 60%, semi-fatty alkyds with a fatty acid content of between 45 and 60% and lean alkyds with a fatty acid content of less than 45%. The consistency varies from syrupy in the case of the fatty alkyd resins to brittle in the case of the lean alkyd resins. In the paint industry alkyd resins are often used as binding agents: favourable properties are, for instance, their fast drying and curing. The great variety of types presents the possibility of attuning the choice to the purpose (so-called tailor-made types): lean, fast-drying types are used, for instance, for spray paints for industry; fatter types that dry somewhat slower are on the other hand very suitable for application by brush and, consequently, for house paints. In this manner each of the many types has its own field of application. According to a preferred embodiment of the invention the alkyd resins which are prepared in the presence of 3-20 wt % monoalcohol with between 5 and 13 carbon atoms, such as hexanol, nonanol or decanol, are applied. Among other affects, this increases the solubility in alkanes.

Alkanes are less harmful solvents than solvents containing aromatics.

Alkyd resins are combined with, for instance, carbamide and melamine resins for use in stoving varnishes; in combination with cellulose nitrate (nitrocellulose) they yield the so-called combination lacquers. One way of preparing modified alkyd resins is heating a bivalent acid or its anhydride with a multivalent alcohol and a fatty acid. In the fatty acid method dicarboxylic acid (anhydride), polyalcohol and fatty acid are heated to abt. 250 °C. until the required acid number and the required viscosity are obtained. In the monoglyceride method, the fatty acids obtained after esterification of a suitable oil are used for the modification with glycerol to monoglyceride. Then dicarboxylic acid (anhydride) is added and the mixture is treated in the same manner as in the fatty acid method. In the solvent method the reaction is carried out in the presence of a solvent that is immiscible with water. The polyalcohols used most often are glycerol, pentaerythritol, trimethylolpropane and sorbitol. The principal polycarboxylic acids are, for instance, phthalic acid (anhydride) and maleic acid the fatty acids of linseed, ricinus, soya bean and coconut oil are often used as fatty acids. Ester, copal and phenol resins, styrene and silicones may be used as modifying agents.

(Pre)polymers based on isocyanate groups, if so desired modified with acrylates or methacrylates, hydroxy-terminated polyethers or polyesters, if so desired modified with acrylates or methacrylates, epoxy resins, if so desired modified with acrylates or methacrylates, or polyesters based on epoxidized oils and acrylic or methacrylic acid may, for instance, be used as (modified) condensation polymers.

Vinyl polymers with allyl functionality: C=C—CH such as allyl(math)acrylates or vinyl polymers with drying oil functionality may, for instance, be used as vinyl addition polymers.

Linseed oil, soya bean oil, sunflower oil, safflower oil, tall oil and conjugated soya bean oil or epoxidized drying oils may, for instance, be used as drying oil instead of the polymer.

The resin composition according to the invention is used by preference as such ('100%-solid') as a binding agent for, for instance, paint.

It is also possible to use non-reactive solvents. As such, conventional solvents such as aromatic or aliphatic hydrocarbons with 6–25 carbon atoms may be used. Preferably the amount of solvent is less than 40 wt %, more in particular less than 20 wt % (based on the total amount of the polymer and ester). In practice, the amount of solvent chosen will often depend on economic (cost price) considerations.

The resin composition according to the invention can be used as basic resin for alkyd dispersions.

The ester according to the invention comprises as carboxylic acid with 10–24 carbon atoms and at least one non-terminal ethylenically unsaturated double bond, for instance carboxylic acids or mixtures thereof with straight or branched chains such as 3-decenecarboxylic acid, 2-ethyldecenecarboxylic acid, dodecenacarboxylic acid, 4-athyldodecenecarboxylic acid and fatty acids with 16–20 carbon atoms.

Preferably $R^1$ is an alkyl group with 16–20 carbon atoms, in particular with a —CH=CH—CH$_2$—CH=CH— group, and $R^2$ is preferably a bisallylether of a polyfunctional alcohol derivative.

Carboxylic acids with the structural unit: —CH=CH—CH$_2$—CH=CH— are highly suitable, because the diallylic hydrogen is easily eliminated under the influence of oxygen and, as such, acts as polymerization initiator.

According to a preferred embodiment of the invention the ester has the following formula:

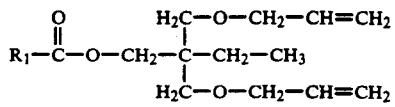

wherein $R^1$ is an alkylene radical with 16–20 carbon atoms, comprising the structural unit —CH=CH—CH$_2$—CH=CH—.

As allylether-containing group, a group is preferably chosen with the formula:

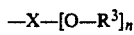

where:
n=1–5
X=a polyol derivative with 2–20 carbon atoms and a functionality of at least n+1 and
$R^3$=an allyl derivative.

Preferably, n=2–4, consequently the drying properties are better.

Glycol, propanediol, butanediol, cyclohexanediol, 1,1,1-trimethylol propane, glycerol, pentaerythritol, sorbitol or 1,2,3-butanetriol may, for instance, be used as X.

$R^3$ may, for instance, be derived from a 1-alkene-3-ol such as 1-propylene-3-ol, 1-butylene-3-ol, 1-pentylene-3-ol and 2-cyclhoexene-1-ol, but also from alkixylated 1-alkene-3-ols. Preferably a 1-alkene-3-ol with fewer than 7 carbon atoms, in particular fewer than 5 carbon atoms is used.

The ester can be prepared by, for instance, esterification of an unsaturated fatty acid with an alcohol containing allyl groups such as trimethylolpropanediallylether, pentaerytritoldiallylether, trimethylolpropane monoallylether, butanediol monoallylether, cyclohexanediol monoallylether.

The resin composition according to the invention can be simply prepared by mixing the ester with the polymer.

The resin composition according to the invention may contain the usual additives such as siccatives, pigments and stabilizers.

The resin compositions according to the invention can be used as bases for paint compositions in wall paints and wood paints.

The resin compositions according to the invention present a negligible emission of solvents if only the ester according to the invention is used as solvent and, in addition to the low solvent emission, they then also possess good coating properties, such as good drying properties, curing properties resistance to solvents, resistance to abrasion, resistance to chemicals, flexibility, gloss and resistance to scratching.

The ester according to the invention can be applied in compounds which are curable by radical polymerization and in paint compositions which are airdryable.

The invention is elucidated with the following examples, without, however, being limited thereto.

EXAMPLES

Example I

Preparation of the esters

A four-necked flask with a volume of 3 liters equipped with a stirrer, nitrogen inlet, thermometer and a 'Dean and Stark' apparatus connected to a cooler was filled with 1124 g (5.25 mol) of trimethylolpropanediallylether and 1410 g (5.00 mol) of soya bean fatty acids. After addition of 60 g of xylene for the azeotropic removal of water, the mixture was heated to 245°–250° C. (below a nitrogen blanket). The esterification was completed after 6 hours, after which 90 ml of water had been removed by distillation. The residual xylene and the excess of trimethylolpropanediallylether were removed by cooling the flask in vacuum. The product obtained had the following properties:

| | |
|---|---|
| acid number | 5.2 |
| colour | 1 (Gardner) |
| Viscosity | 0.2 d Pa.s (Emila rotoviscometer at 23° C.). |

In the same manner a trimethylolpropane monoallylether was esterified with a slight shortage of soya bean fatty acids.

Example II

Paint composition I

An air-drying paint composition with a high solids content was prepared by mixing 80 parts by weight of an alkyd based on soya bean fatty acid (oil length: 81%; acid number: 8, viscosity 130 dPa.s at 25° C.) with 20 parts by weight of soya bean fatty acid ester of trimethylolpropanediallyl ether. To this the following were add ad: 27.9 parts by weight of white spirit (boiling range 182°–212° C.) free from aromatics, 80 parts by weight of titanium dioxide, 3 parts by weight of 10% calcium decanate, 0.6 parts by weight of 10% cobalt decanate, 0.5 parts by weight of 10% zinc decanate, 2.0 parts by weight of 12% zirconium decanate and 1.5 parts by weight of methyl ethyl ketoxime as anti-skinning agent. The weight percentage of solids was 85% and the viscosity was 5.5 dPa.s (determined according to the ICI cone and plate method at 20° C.). The paint dried very well.

Example III and Comparative Example 1

Paint compositions II and A

Two paint compositions were prepared by mixing the ingredients shown in Table 1. As alkyd resin a linseed oil was used with an oil length of 75%, an acid number of 8 and a viscosity (50% in white spirit, 161°–197° C.) of 0.23 Pa.s at 25° C.

TABLE 1

| ingredients | II | A |
|---|---|---|
| alkyd resin | 49.65 | 47.93 |
| white spirit (161–197° C.) | 32.78 | 46.56 |
| ester of soya bean fatty acid and monoallylether of trimethylolpropane | 10.63 | — |
| trimethylolpropane siccative mixture | 60.3 | 4.79 |
| anti-skinning agent | 0.90 | 0.72 |
| properties | | |
| solids wt % | 63.96 | 50.85 |
| viscosity | 5 dPa.s | 5 dPa.s |
| drying* | 4 | 2 |

*on an arbitrary 0–5 scale: 5 = very good
4 = good
3 = fair
2 = bad
1 = very bad These tests show that in addition to a higher solids content at the same viscosity, the compositions also dry better.

Example IV 60 parts by weight of an alkyd resin based on isophtalic acid, pentaerytritol and talloil fatty acid and prepared by a step by step preparation were solved in 40 parts by weight of reactive diluent mixture, which consisted 50 parts by weight of the reaction product (prepared at 240° C.) of 1 equivalent soyabean fatty acid and 1 equivalent monoallylether of trimethylolpropane, and 50 parts by weight of an oligomer prepared by esterification at 240° C. of trimellitic acid anhydride, dipentaerytritol and soyabean fatty acid (weight ratio 1:3:15). The weight percentage of solids of the resulting binding agent was 100% (viscosity 20 dP.s at 25° C.).

Example V

Paint composition II

A paint was prepared with the following binding agent composition:
- 20 wt. % of the ester according to Example I,
- 60 wt. % of an alkyd resin based on tall oil fatty acid, pentaerythritol and isophthalic acid. (This resin had an acid number of 8 mg of KDH/g and a viscosity of 800 dFa.s at 23° C.).
- 20 wt. % of an oligomer prepared by esterification, in a manner known in the art, of 1 mole of trimellitic acid anhydride, 3 moles of di-pentaerythritol and 15 moles of tall oil fatty acid, The paint was diluted to a viscosity of 5 dPa.s at 20° C. before application. The solids content was 85%. The drying properties are given in Table 1.

Example VI

Paint composition III

A paint was prepared with the following binding agent composition:
- 40 wt. % of the ester according to Example I and
- 60 wt. % of the alkyd resin mentioned in Example V.

The paint was diluted to a viscosity of 5 dPa.s at 20° C. before application. The solids content was 91%. The drying properties are given in Table 1.

TABLE 1

| Paint | II | III |
|---|---|---|
| Sand drying time (hrs) 76 nm film | 5.5 | 8 |
| After-tack after 24 hours (1 = poor; 5 = good) | 3 | 1 |
| König hardness (sec) after 14 days, 100 μm film | 21 | 17 |

The above data show that the drying behaviour of the paint improves when an ester and an oligomer are used in the paint composition. In addition, paint composition III appeared to sag when applied to vertical plates.

We claim:

1. Resin composition containing a polymer and an ester of an unsaturated fatty acid and an alcohol containing a terminal unsaturation, wherein said ester is of the formula:

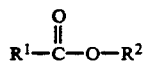

where:
R$^1$ is an alkenyl radical with 10-24 carbon atoms and at least one non-terminal ethylenically unsaturated bond, and
R$^2$ is a derivative of an organic group comprising one or more terminal allylether groups.

2. Resin composition according to claim 1, wherein the resin composition is substantially 100%-solid.

3. Resin composition according to claim 1, wherein R$^1$ is an alkylene radical with 10-17 carbon atoms.

4. Resin composition according to claim 1, wherein R$^2$=[—X—[O—R$^3$]$_n$ where
n=1-5
X=a polyol derivative with 2-20 carbon atoms and with a functionality of at least n+1 and
R$^3$=an allyl derivative.

5. Resin composition according to claim 1, wherein the ester has the following formula:

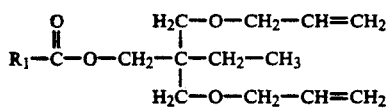

where R$^1$ is an alkylene radical with 16-20 carbon atoms comprising the structural unit —CH=CH—CH$_2$—CH=CH—.

6. Resin composition according to claim 1, wherein the resin composition contains 20-99 wt % of a polymer which is cured by radical polymerization and 1-80 wt % ester, the weight percentages being based on the total amount of polymer and ester.

7. Resin composition according to claim 6, wherein the resin composition additionally contains 0.1-50% by weight of an oligomer comprising at least 10 fatty acid units.

8. Reactive diluent for paint compositions comprising a fatty acid ester of a polyalcohol allyl ether and an oligomer with at least ten unsaturated fatty acid units, wherein said fatty acid ester is of the formula:

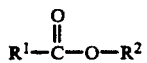

wherein
R$^1$ is an alkylene radical having 10-24 carbon atoms and at least one non-terminal ethylenically unsaturated bond, and
R$^2$ is a derivative of an organic group consisting one or more terminal allyl ether groups.

9. Reactive diluent according to claim 8, wherein the oligomer has between 12 and 20 fatty acid units.

10. Reactive diluent according to claim 8, wherein the oligomer has a molecular weight of between 4000 and 6000.

11. Reactive diluent according to claim 8, wherein the ester:oligomer weight ratio is between 25:75 and 75:25.

12. Resin composition according to claim 1, wherein the resin compostion contains an alkyd resin as polymer.

13. Resin composition according to claim 12, wherein the alkyd resin is prepared in the presence of 3-20 wt % of a monoalcohol with between 5 and 13 carbon atoms.

14. Resin composition according to claim 4, wherein the polyol derivative X is selected from the group consisting of glycol, propanediol, butanediol, cyclohexylene diol, 1,1,1,-tri-methylol propane, glycerol, pentaerythritol, sorbitol, and 1,2,3-butanetriol.

15. Resin composition according to claim 4, wherein the allyl derivative R$^3$ is selected from the group consisting of 1-propylene-3-ol, 1-butylene-3-ol, 1-pentylene-3-ol and 2-cyclohexylene-1-ol.

16. The reactive diluent according to claim 8, wherein said fatty acid ester has the following formula

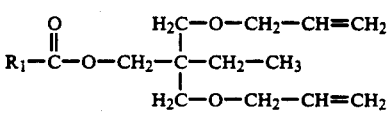

wherein R$^1$ is an alkylene radical with 16-20 carbon atoms comprising the structural unit —CH=CH=CH$_2$—CH=CH—.

17. The reactive diluent according to claim 8, wherein R$^2$ is —X[O—R$_3$]$_n$ where
n=1-5,
X=a polyol derivative with 2-20 carbon atoms which has a functionality of least n+1, and
R$^3$=an allyl derivative.

18. Resin composition comprising:
(a) 20-80 parts by weight alkyd resin,
(b) 10-50 parts by weight of a reactive diluent which comprises a fatty acid ester of a polyalcohol allyl ether and an oligomer with at least ten unsaturated fatty acid units, wherein said fatty acid ester is of the formula:

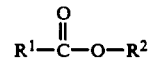

wherein
R$^1$ is an alkylene radical having 10-24 carbon atoms and at least on non-terminal ethylenically unsaturated bond, and
R$^2$ is a derivative of an organic group comprising one or more terminal allyl ether groups, and
(c) 0-40 parts by weight non-reactive diluent.

19. The resin composition according to claim 18 wherein said fatty acid ester has the following formula

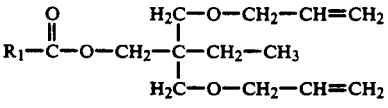

wherein R$^1$ is an alkylene radical with 16-20 carbon atoms comprising the structural unit —CH=CH=CH$_2$—CH=CH—.

20. The reactive diluent according to claim 18, wherein R$^2$ is —X[O—R$_3$]$_n$ where
n=1-5,
X=a polyol derivative with 2-20 carbon atoms which has a functionally of least n+1, and
R$^3$=an allyl derivative.

* * * * *

UNITED STATES PATENT AND TRADEMARK OFFICE
CERTIFICATE OF CORRECTION

PATENT NO. : 5,064,892
DATED : November 12, 1991
INVENTOR(S) : Adriaan HOFLAND and Joannes PAAUWE It is certified that error appears in the above-identified patent and that said Letters Patent is hereby corrected as shown below:

Column 9, Line 19, change "alkylene" to -- alkenyl --;

Line 35, change "alkylene" to -- alkenyl --;
       Lines 36 and 37 change the structural unit to read as
-- $-CH=CH-CH_2-CH=CH-$ --;

Line 56, change "alkylene" to -- alkenyl --;

Line 59, change "consisting" to -- comprising --;

Column 10, Line 24, change "alkylene" to -- alkenyl --;

Line 45, change "alkylene" to -- alkenyl --;

Line 60, change "alkylene" to -- alkenyl --.

Signed and Sealed this

Twenty-sixth Day of October, 1993

Attest:

BRUCE LEHMAN

*Attesting Officer*    *Commissioner of Patents and Trademarks*